United States Patent

Dey

[11] 3,945,846
[45] Mar. 23, 1976

[54] MINIATURE CONCENTRIC BATTERY
[75] Inventor: Arabinda N. Dey, Needham, Mass.
[73] Assignee: P. R. Mallory & Co. Inc., Indianapolis, Ind.
[22] Filed: Dec. 12, 1972
[21] Appl. No.: 314,316

[52] U.S. Cl. .............................. 136/100 R; 136/84
[51] Int. Cl. ........................................... H01m 17/00
[58] Field of Search ......... 136/83, 100, 120, 84, 20, 136/6 LN, 22, 121, 107, 102, 162, 122, 114

[56] References Cited
UNITED STATES PATENTS

| | | | |
|---|---|---|---|
| 2,358,419 | 9/1944 | Schumacher et al. | 136/121 |
| 2,727,082 | 12/1955 | Chubb et al. | 136/30 |
| 2,996,562 | 8/1961 | Meyers | 136/6 LN |
| 3,269,868 | 8/1966 | Carson, Jr. | 136/114 |
| 3,475,226 | 10/1969 | Fraioli | 136/162 |
| 3,493,438 | 2/1970 | Harris | 136/162 |
| 3,532,543 | 10/1970 | Nole | 136/6 LN |
| 3,567,515 | 3/1971 | Maricle et al. | 136/6 LN |
| 3,645,792 | 2/1972 | Hacha | 136/83 R |
| 3,749,607 | 7/1973 | Jasinski et al. | 136/83 R |

Primary Examiner—John H. Mack
Assistant Examiner—C. F. Lefevour
Attorney, Agent, or Firm—Ronald S. Cornell; Israel Nissenbaum; Charles W. Hoffman

[57] ABSTRACT

A miniature cell 0.1 inch diameter, and 0.75 long using lithium/sulphur dioxide electrolyte complex; and the method of preparing it. A hypodermic needle sealed at its outer end serves as an anode support and current collector and also provides a conduit for injecting a liquid electrolyte into the cell.

7 Claims, 6 Drawing Figures

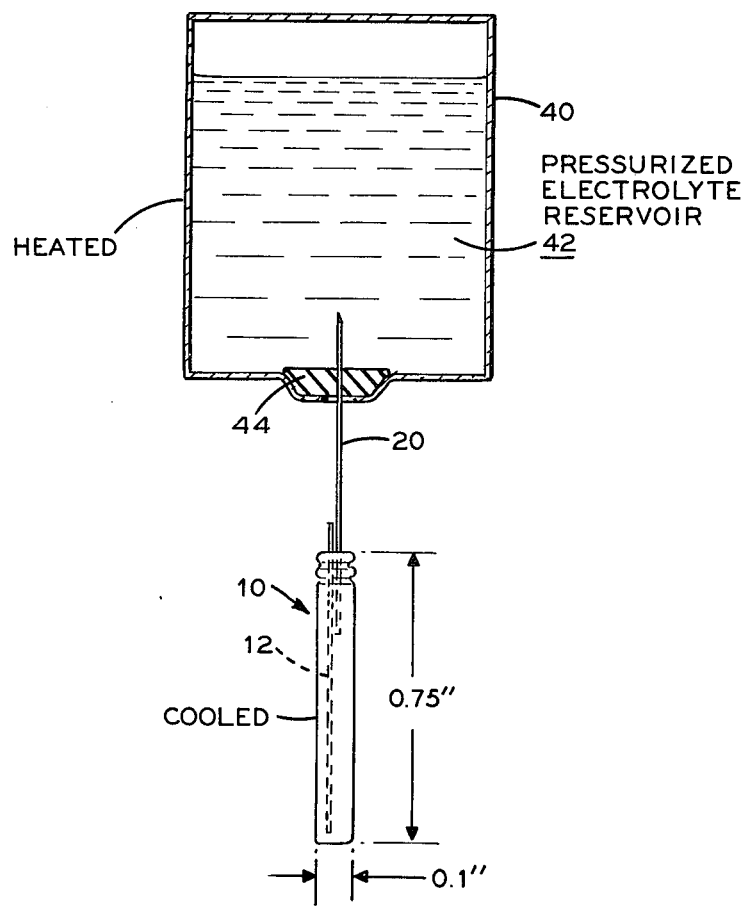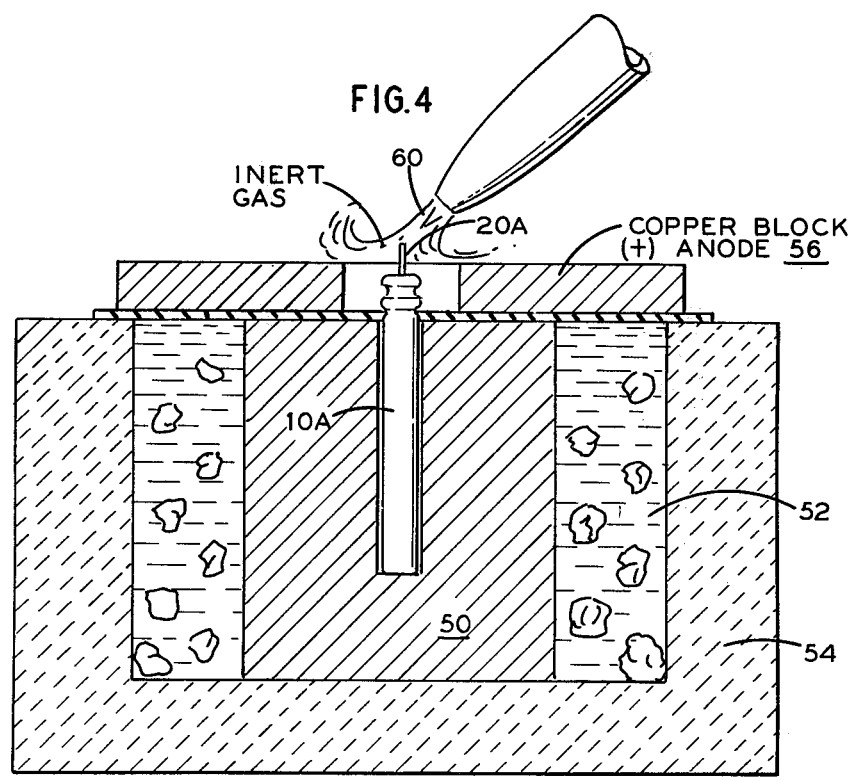

MINIATURE CONCENTRIC BATTERY

This invention relates to a miniature cylindrical electric cell utilizing a lithium sulphur dioxide organic electrolyte combination to obtain the benefits of the high energy content of the elements of a cell utilizing that construction.

There are many applications, where, because of space limitations, a miniature primary cell could be beneficially utilized. The present invention is directed to a construction of a miniature cell, and to a method of making such miniature cell, in dimensions as small as a diameter of 0.1 of one inch and a length or height of 0.75 inch, in which advantage is taken of the high energy content that can be disposed, even in this small volume and weight, with a lithium sulphur dioxide system.

The primary object of this invention is to provide a primary electric cell employing a lithium sulphur dioxide system, which can be made within the small dimensions define by a diameter of 0.1 inch and a height or length of 0.75 inch.

Another object of this invention is to provide a cell of these miniature dimensions, which can be made to provide the usual satisfactory kind of operation of a larger cell of the same elements, and which is made by a method of forming the cell that overcomes the usual difficulties of working with materials in a space of such diminutive dimensions. Those difficulties include the problem of transferring the sulphur dioxide electrolyte into the small volume of space in the cell, and the problem of sealing the cell to prevent leakage loss of the sulphur dioxide electrolyte.

The amount of energy that may be stored in a primary electric cell of this type appears to bear a direct relationship to the quantity of the electrolyte which can be disposed in the cell. This is a problem that requires that the sulphur dioxide shall be introduced into the cell under pressure, in order to assure proper volume and quantity for maximum stoichiometric relationship to the anode and the cathode materials, which latter already have the advantage of being in solid state formation, and, therefore, are essentially of maximum mass and energy content with relationship to the space allotted to them as cell components.

One of the major problems in manufacturing any closed electric cell is encountered in sealing the cell. In the construction of a miniature cell of the dimensions here involved, the sealing problem is especially difficult. Moreover, the presence of the lithium as an element or component in the cell requires that all of the assembly work be done in a dry atmosphere, since any aqueous moisture would introduce hazardous conditions because of the extreme activity of lithium in the presence of moisture.

Thus, the assembly of the cell and the sealing of the cell must be done in a dry atmosphere, all of which introduces complications in the handling, the sealing and the filling operations.

Accordingly, this invention provides both a design construction, and a method of assembly and filling, to assure the formation and maintenance of a seal, and that will then permit filling an already sealed cell container, under pressure, without destroying the seal, and that will then keep the cell hermetically sealed to prevent leakage of the pressurized sulphur dioxide electrolyte, in order thereby to retain the volume of sulphur dioxide needed for the proper performance of the cell.

In accordance with the invention, the cell is constructed with a container casing formed from thin hollow tubing, on whose inner surface a porous layer of carbon is formed as a cathode. A small elongated cylindrical anode of lithium metal is formed on a linear metallic collector, as a solid pin support for the lithium, for concentric coaxial disposition within said cathode. The anode thus formed is enwrapped in a layer of thin insulating separator material, such as a sheet of porous paper or a sheet of microporous polypropylene, and this assembly, of the anode and the separator wrap, is then axially moved into the cylindrical central axial space within the surrounding cylindrical cathode layer. The lithium sulphur dioxide electrolyte system of the cell consists of the lithium anode, the carbon cathode, and an electrolyte mixture of liquid sulphur dioxide, lithium bromide, acetonitrile and propylene carbonate.

During the preparation of the lithium anode for such disposition, the outer extending end of the anode collector pin is anchored in a rubber septum, which is essentially a rubber bead on the anode pin; and the rubber septum is sized so it will slidingly fit internally into the outer open end of a container can, as the entire anode assembly is axially inserted into operating position in the can. A hypodermic needle has been previously inserted in and through the rubber septum together with the anode collector pin, before sealing the assembly in the can, so that the hydrodermic needle will be available as a conduit to conduct the electrolyte into the can after the rubber septum is sealed in place at the originally open end of the can, with the anode structure supported in proper position in the can. The hypodermic needle is used to introduce the electrolyte under sufficient pressure to put the desired quantity of the electrolyte into the cell container which has been previously dry sealed. After that filling operation, the hypodermic needle is gradually withdrawn, so the rubber septum will reclose the opening behind the needle, as the needle is withdrawn, and will thus maintain the seal to prevent leakage of the electrolyte.

In another modification, the hypodermic needle serves both as the filling conduit and as the anode collector pin for supporting the body of the lithium anode material, and is permanently disposed and sealed in the rubber septum. The needle is utilized as a filling port to introduce the electrolyte to the amount wanted; and then the input end of the hypodermic needle, outside of the cell, is closed off and welded closed at its outer end to complete the seal for the cell.

The low boiling point of the electrolyte introduces a problem in the operation of filling the cell through the hypodermic needle. To introduce a pressurized electrolyte into the cell would involve the creation of a pressure gradient between the electrolyte reservoir and the cell. To avoid that, the electrolyte is heated while the cell itself is cooled by a heat sink to a temperature of from minus ten degrees Centigrade to minus seventy-eight degrees.

The construction of the cell, and the method of forming, sealing and filling the cell, are explained in more detail in the following specification, and are illustrated in the accompanying drawings, in which FIG. 1 is a vertical sectional view of one modification of a cell to show the general disposition of the components and elements, a construction for one method of filling the cell;

FIG. 2 is a schematic diagram illustrating the electrolyte transfer system employed herein for filling the cell;

FIG. 4 is a schematic diagram of the apparatus and a welding system for completing the sealing of the cell;

The general features of this invention involve the construction and the filling operation of a miniature cylindrical cell having a diameter of 0.1 inch and a length of 0.75 inch. The operating parameters of the cell will be understood from the energy output requirements which were set at (24) milli-watt-hours, at 2 to 3 volts, for currents of 2 to 3 milliamperes. The cell employs a lithium sulphur dioxide ($Li/SO_2$) organic electrolyte system, consisting of a lithium anode, a carbon mix cathode, and an electrolyte mixture of liquid sulphur dioxide ($SO_2$), lithium bromide (LiBr), acetonitrile and propylene carbonate.

Figure 1:
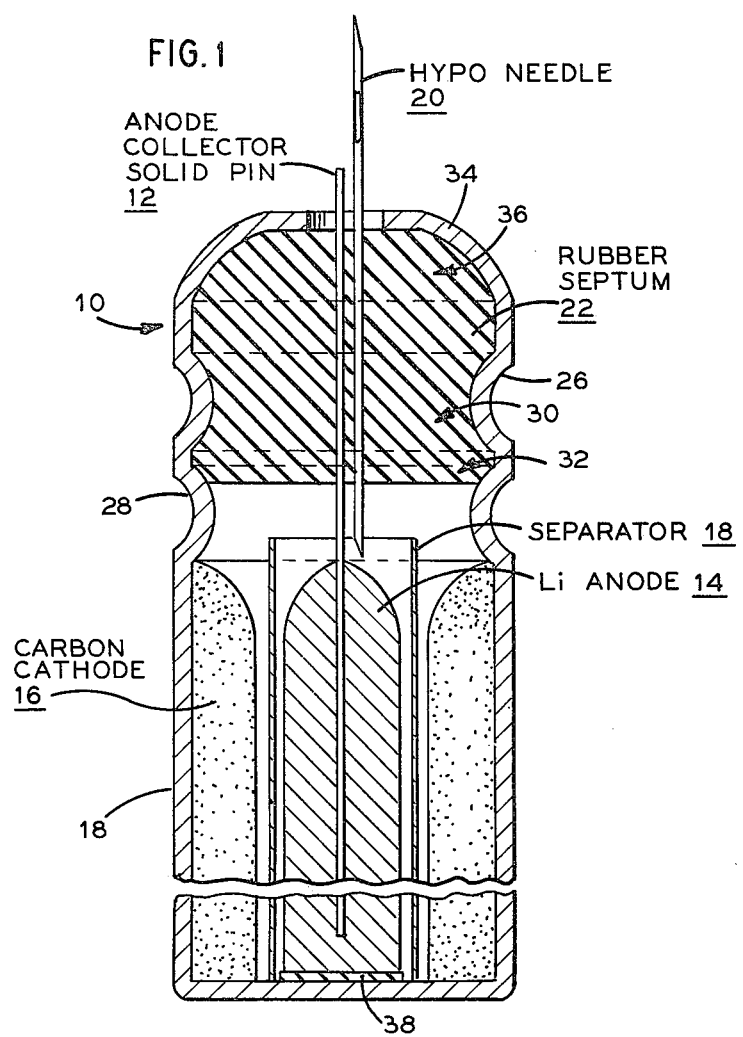

Two modifications of cell design are illustrated. The first modification 10 of the cell is shown in FIG. 1, and consists of a solid pin collector 12 for a central concentric axially disposed lithium anode 14, a concentric outer carbon cathode 16 supported on the inner wall surface of an enclosing cylindrical aluminum can 18, with the lithium anode 14 and the carbon cathode 16 separated by an insulating separator 18. The electrolyte in liquid phase is introduced into the cell by injection through a hypodermic needle 20, that extends through a rubber septum 22, that is used to dry seal the can before the electrolyte is introduced. The needle is removed after the electrolyte is introduced into the cell.

Operational tests on the cells of the construction here shown indicate that the stoichiometric capacity is determined by the weight of the introduced electrolyte which contains the sulphur dioxide to serve as a depolarizer.

The sulphur dioxide depolarizer is introduced into the cell which has been previously sealed closed. As shown in FIG. 1, the rubber septum 22 is compressed between tow inwardly directed beads 26 and 28, on the can 18, which serve to radially tightly compress the rubber septum 22 in the region 30, and serve to crimp and clamp the rubber septum tightly around a circular peripheral region 32. In addition, the upper initially open end of the aluminum container can 18 is tightly peened over radially inward at the region 34 to compress the upper portion 36 of the rubber septum 22 to impress a downward clamping pressure, by the peened-over section 34, onto the upper surface of the rubber septum 22. A teflon disc 38 insulates the bottom of anode 14 from the metal can 18.

The filling operation is performed outside the dry box. When the filling operation is accomplished, the hypodermic needle 20 is slowly and gradually withdrawn from the septum 22, in order that the rubber septum may reclose the opening which was temporarily filled by the hypodermic needle, and thus maintain the sealing action of the rubber septum.

The filling operation may be better explained upon considering the system shown in FIG. 2. As shown there, schematically, a closed container reservoir 40, which contains the liquified electrolyte 42, is provided with a rubber septum 44 through which the upper end of the hypodermic needle 20 of the cell of FIG. 1 extends into the reservoir 40. Vapor pressure in the reservoir provides the pressure to force the electrolyte through the hypodermic needle into cell 10 to be filled.

To simplify the filling operation, and to permit filling with maximum quantity, as desired, the electrolyte in reservoir 40 is heated and the cell 10 is kept cooled to a temperature from about minus 10° to −78° C.

The manner in which the cell is kept cooled during the filling operation is schematically indicated in the schematic diagram in FIG. 4. As there shown, the cell 10 body is closely thermally coupled in a metal block 50, of highly heat-conductive metal, such as copper, and the block 50, in turn, is immersed in a cold bath 52, of dry ice and acetone, to bring the temperature of the block and the cell 10 down to at least −10° C. The freezing bath 52 is contained in a suitable insulated tank 54. When the cell has been filled, the final sealing operation is then performed, by withdrawal of the hypodermic needle 20, from a cell of the first modification, of FIG. 1.

However, with a relatively shallow rubber septum to serve as a seal, in that first modification, the vapor pressure that is generated within the cell, — as some of the fluid electrolyte vaporizes and releases some of the sulphur dioxide —, is sufficient to cause some of the sulphur dioxide to seep through the reclosed opening in the septum from which the hypodermic needle has been withdrawn. Because of that sealing problem, in that first modification, the sealing structure is modified, according to the second modification, as shown in FIG. 3, to permit the hypodermic needle to remain permanently embedded and sealed in the sealing septum.

Figure 3:
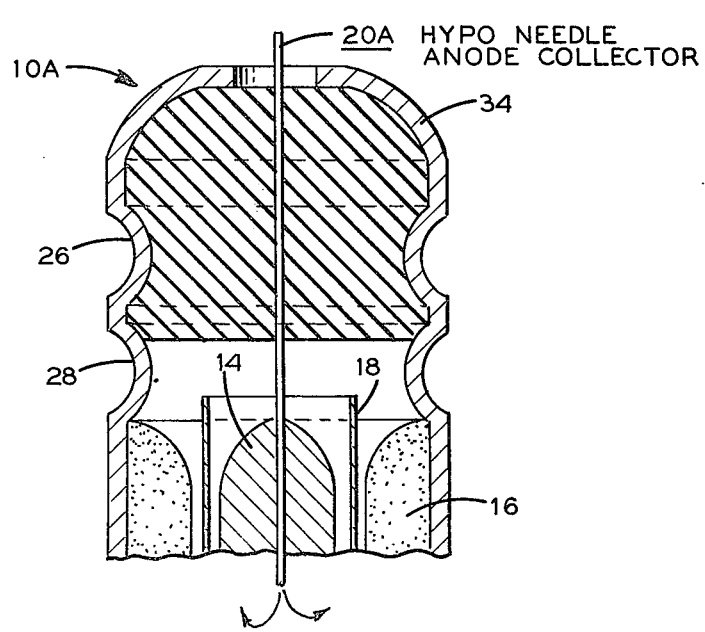
FIG. 3 is a vertical cross-sectional view of a second modification of the invention, in the cell top of a modified cell in which the hypodermic needle serves also as the anode collector, after the electrolyte filling operation is completed and the hypodermic needle is sealed closed.

As shown in FIG. 3, in cell 10A, the hypodermic needle here identified as 20A, is employed to serve, also, ultimately, as the anode collector, support the lithium anode material 14. The other elements of construction in the cell 10A are otherwise the same as in the cell 10 in FIG. 1, so that the change here has been to utilize the hypodermic needle in FIG. 3 to serve also as the anode collector, after the hypodermic needle has served to introduce the electrolyte into the cell 10A. In this structure, in FIG. 3, the fluid introduced into the combination hypodermic needle and anode collector, travels down through the needle as a tube and exits from the bottom of said tube into the operating space between the lithium anode and the cathode until the desired amount of electrolyte is introduced into the cell. After such filling operation, the combination needle and anode collector is separated from any filling source and closed above the septum seal, and sealed as shown in the operation in FIG. 4.

As shown in FIG. 4, the cell 10A, after being filled, is sealed by closing off the upper end of the combination needle and anode collector 20A. To illustrate a step in the invention, the sealing operation is shown as performed by a plasma gas flame 60. Tungsten Inert Gas welding is used for sealing the hypodermic needle, and welds the tube as close to the cell top as possible. A schematic diagram of the fixture is shown in FIG. 4. The cell is kept cold with dry ice during welding to avoid loss of $SO_2$ by local heating. The copper block used to make the electrical connection between the hypodermic needle and the ground terminal of the welder serves as a heat sink. The gas operated tungsten cathode is positioned just above the tip of the hypodermic needle which is to be sealed. On triggering the welder, the plasma melts the hypodermic needle tip and forms a round bead of metal thereby sealing the tip. The same sealing operation may be performed, electrically, by a suitable contact pressure spot welding device, in which the two welding electrodes may first compress the top end of the hypodermic needle collector 20A, and then apply a pulse of energy to effect the weld. During such sealing operation of the hydpodermic needle to seal the cell 10A closed, the cooling effect of the metal block 50 and the surrounding cold bath 52 serves to extract immediately any heat that may momentarily try to enter the cell as a result of such weld and sealing operation. The upper copper block 56 helps to cool the atmosphere around the top of the hypodermic needle as it is being sealed closed.

The double beading 26 and 28 provides a tight compression on the septum and a good seal. The height of the rubber septum employed here is 0.065 inch.

The nature of the problems that are encountered in the manufacture and filling of such a miniaturized cell, will be realized from the dimensional parameters, previously stated as about 0.75 inch in length with a diameter built up on the needle as a collector, is 0.036 inch in diameter, within a cathode bore of 0.046 inch to 0.52 inch.

Figure 5:
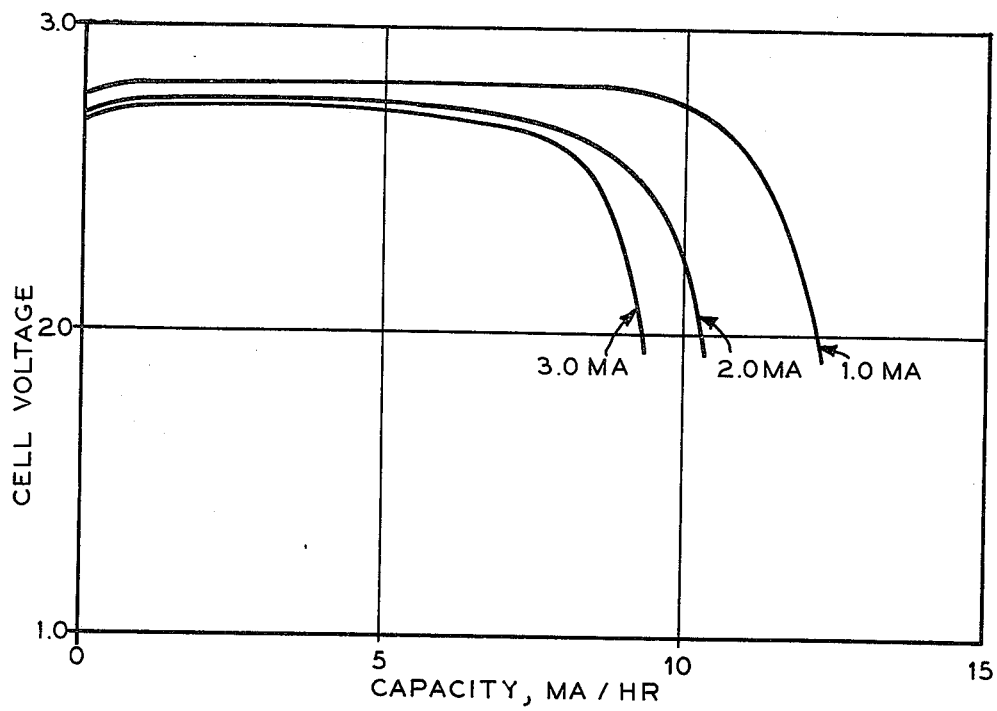
FIG. 5 is a graph showing several illustrative discharge curves of several of the cells, constructed in accordance with the present invention.

The excellent results that may be achieved, nevertheless, from such a cell, in spite of its miniature dimensions, as long as the cell is properly combined and assembled, and adequately filled with electrolyte, may be realized from the graphs shown in FIG. 5, where the three curves show that the voltage of the tested cells remain excellently constant at their desired operating values, for a discharge capacity of seven to eight milli-ampere hours, for drains from 0.1 up to 3.0 milliamperes, with the voltage maintained at its normal value for even greater milliampere-hour operation where the drain is limited to 1 milliampere.

Figure 6:
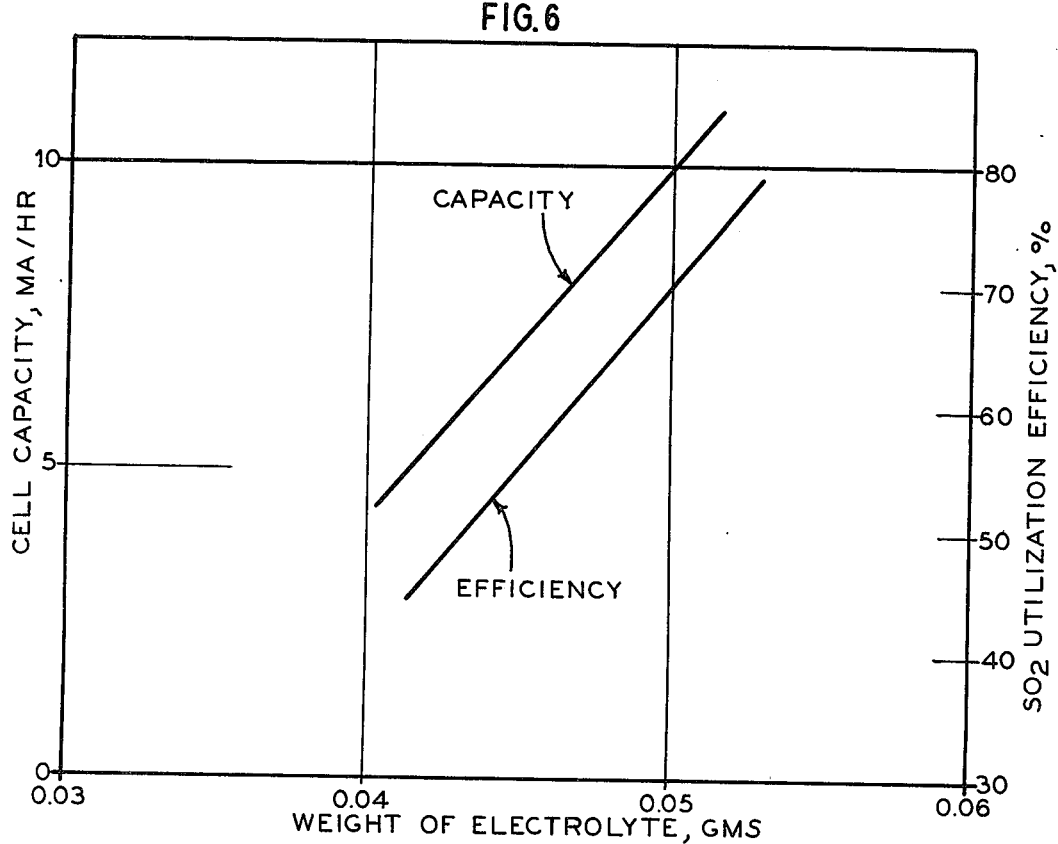
FIG. 6 is a graph showing the realized capacity and the efficiency of the cells of this invention, as a function of electrolyte weight for a continuous discharge of two milliamperes.

FIG. 6 illustrates the relationship of the capacity and efficiency of the small cells as a function of the electrolyte weight at a medium discharge of two milliamperes.

It was possible to realize an energy output target of 25 milliwatt-hours at 2 milliamperes, with the miniature cells disclosed here.

Thus, in accordance with the invention here disclosed, a miniature cell may be made with the filling and sealing operations as disclosed, that will assure desired operativeness and good shelf life against leakage. The filling operation is controlled to assure the proper stoichiometric quantity of electrolyte for maximum life. The design is made such as to leave a small volume of space above the fluid electrolyte, to provide a vapor space.

What is claimed is:

1. A primary electric cell, comprising
   an elongated cylindrical metallic container can;
   a layer of carbonaceous cathodic material on the cylindrical inner surface of said can to serve as a cathode;
   means including a linear metal hypodermic needle element sealed at its outer end disposed axially within said can to serve as an anode support and current collector, and said means also providing a conduit for injecting a liquid electrolyte into the cell during manufacturing assembly;
   a layer of lithium metal supported on the outside surface of said linear metal element to serve as an anode;
   a cylindrical separator of electrically insulating material between said anode and cathode;
   an insulating sealing element supported on and at the top end of said can, with said linear element extending through and insulatingly supported by said sealing element to serve as an anode collector;
   and a predetermined quantity of liquid electrolyte in said cell.

2. A primary cell, as in claim 1, in which
   the diameter of the cell container can is of the order of 0.1 inch;
   and the length of said can is of the order of 0.75 inch.

3. A primary electric cell, as in claim 1, in which
   the inner end of said linear metal element, is insulatingly spaced from the surface of the bottom wall of said container can.

4. A primary electric cell, as in claim 1, in which
   the quantity of liquid electrolyte injected into the cell is predetermined and its top level is initially spaced from the bottom plane of the sealing element to leave a small vapor space above the electrolyte.

5. A cylindrical concentric miniature organic electrochemical cell containing a pressurized electrolyte while having its open end always sealed, said cell being extremely small, about 0.1 in diameter and 0.75 in length but having a high energy output of about 24 milli-watt hours at about 2–3 volts, and having a current output of 2—3 milli-amps.; said cell further including a lithium, sulfur dioxide electrolyte and having a lithium anode, and a carbon cathode which is on the inner surface of a cell can, said cell being of a cylindrical aluminum configuration, having said lithium anode axially disposed and placed in said electrolyte, a dry seal compression means closing said cell even prior to having said electrolyte included therein so as to maintain proper restraint, said compression means being a rubber septum radially crimped and clamped at the open end of said aluminum cell can, said crimp being obtained by means of a pair of inwardly directed beads; said septum also being compressed downwardly by a peening means on the upper surface of said septum; and a plastic disc resting at the bottom of said can to insulate said anode from said cell can said cell including a linear metal hypodermic needle element sealed at its outer end disposed axially within said can to serve as an anode support and current collector, and also providing a conduit for injecting liquid electrolyte into the cell during manufacture assembly.

6. A cylindrical concentric miniature organic electrochemical cell containing a pressurized electrolyte while having its open end always sealed, said cell being extremely small, about 0.1 in diameter and 0.75 in length but having a high energy output of about 24 milliwatt hours at about 2–3 volts, and having a current output of 2–3 milli-amps., said cell including a lithium, sulfur dioxide electrolyte and having a lithium anode and a carbon cathode on the inner surface of an aluminum can; and having an axially disposed lithium anode spaced therein in said electrolyte; and a dry seal compression means closing said cell even prior to having the electrolyte included therein in order to maintain proper electrolyte restraint, said compression means being a rubber septum radially crimped and clamped at the open end of said aluminum cell can, said crimping being obtained by means of a pair of inwardly directed beads, said septum being compressed at the same time downwardly by a peening pressure means on the upper surface of said septum; and a plastic disc resting at the bottom of said cell to insulate the anode therefrom can said cell including a linear metal hypodermic needle element sealed at its outer end disposed axially within said can to serve as an anode support and current collector, and also providing a conduit for injecting liquid electrolyte into the cell during manufacture assembly.

7. A cylindrical concentric miniature organic electrochemical cell containing a pressurized electrolyte while having its open end always sealed, said cell being extremely small, and miniaturized, being about 0.1 inch in diameter and 0.75 inch in length but having a high energy output of about 24 milli-watt hours at about 2–3 volts, and having a current output of 2–3 milli-amps., said cell including a lithium, sulfur dioxide electrolyte and having a lithium anode, and a carbon cathode on the inner surface of a cell, can said cell being of cylindrical aluminum configuration, and having an axially disposed lithium anode spaced therein immersed in said electrolyte, and a dry seal compression means closing said cell even prior to having the electrolyte included therein so as to maintain proper pressure restraint, said compression means being a rubber septum radially crimped and clamped at the open end of said aluminum cell can, said crimp being effected by means of a plurality of inwardly directed beads, said septum also being compressed at the same time downwardly by a peening pressure means on the upper surface of said septum, and a plastic disc resting at the bottom of said cell to insulate the anode from said can said cell including a linear metal hypodermic needle element sealed at its outer end disposed axially within said can to serve as an anode support and current collector, and also providing a conduit for injecting liquid electrolyte into the cell during manufacture assembly.

* * * * *